April 12, 1932.　　　G. W. HEENE　　　1,854,029

CHUCK FOR EMBOSSING AND VENDING APPARATUS

Filed Aug. 30, 1930　　　2 Sheets-Sheet 1

Inventor
George W. Heene,
By Arthur H. Van Horn
his Attorney

April 12, 1932. G. W. HEENE 1,854,029
CHUCK FOR EMBOSSING AND VENDING APPARATUS
Filed Aug. 30, 1930 2 Sheets-Sheet 2
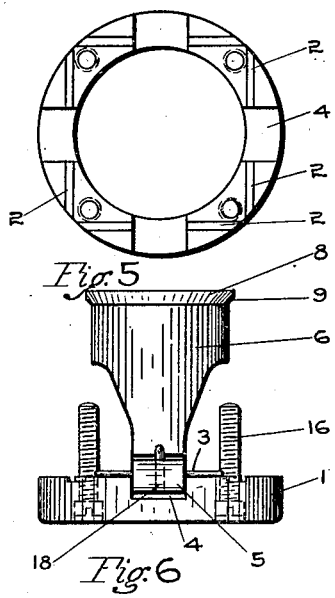
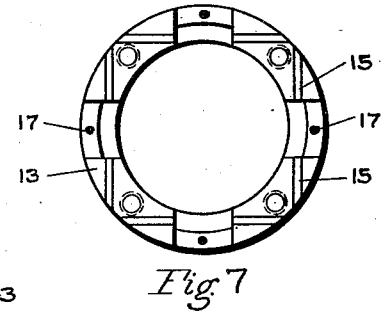
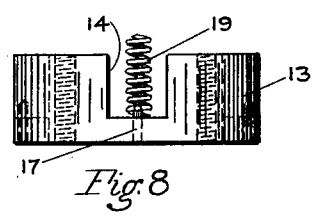
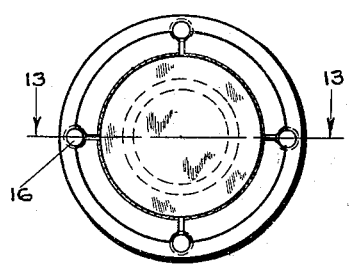
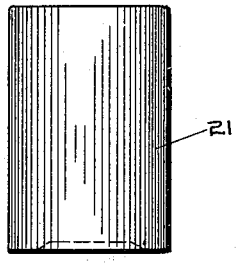
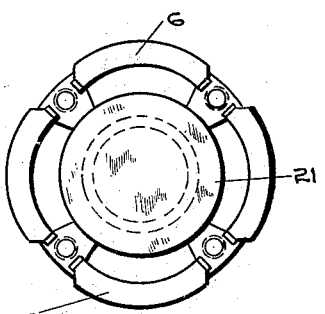
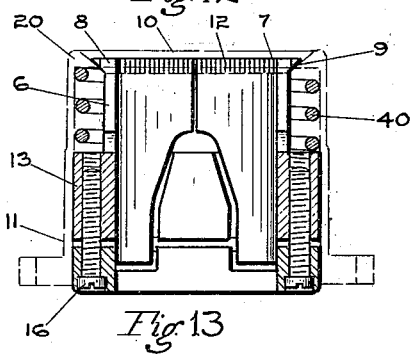
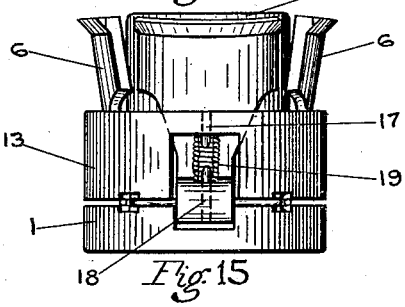
Inventor
George W. Heene,
By Arthur H. Van Horn
his Attorney Patented Apr. 12, 1932

1,854,029

UNITED STATES PATENT OFFICE

GEORGE W. HEENE, OF CLEVELAND, OHIO

CHUCK FOR EMBOSSING AND VENDING APPARATUS

Application filed August 30, 1930. Serial No. 479,064.

My invention relates to an improved apparatus for embossing a blank and vending the same, and relates more particularly to an improved chuck for supporting and gripping the blank during the embossing of characters thereon and which is adapted to release the blank upon completion of the embossing operation and to receive and grip successive blanks.

One of the objects of my invention is to maintain relatively substantial axial alignment of the chuck body and the blank supporting anvil and to provide a blank support which will accurately position the finished blank in the plane of a succeeding unembossed blank, so that the finished blank may be properly discharged and the unembossed blank properly positioned on the anvil to be gripped by the chuck jaws.

Another object of my invention is to construct a chuck of this type in which an increased contact area is provided between the chuck body and the anvil.

Another object of my invention is to provide a chuck of this type which is simple of construction, extremely durable, and which may readily be disassembled if desired.

Other objects and advantages of my invention will become more apparent as the following description of an embodiment thereof progresses reference being made to the accompanying drawings in which like reference characters are employed to designate like parts throughout the same.

Figure 5 is a top plan view of a section of the chuck base.

Figure 6 is a side elevation of the same and shows, in addition, one of the jaws pivotally mounted on the base.

Figure 7 is a bottom plan view of a complementary base section.

Figure 8 is a side elevation of the complementary base section shown in Figure 7.

Figure 9 is a side elevation of one of the jaw supporting pins gripped between the upper and lower base sections when the same are assembled one upon the other.

Figure 10 is an elevation of a blank supporting anvil which operates axially of the chuck.

Figure 11 is a bottom plan view of the anvil.

Figure 12 is a top plan view of the assembled chuck and anvil showing the chuck jaws in closed position.

Figure 13 is a section taken on line 13—13 of Figure 12 showing the shell in broken lines.

Figure 14 is a top plan view of the chuck and anvil showing the chuck jaws in open position and the anvil raised for releasing and lifting the finished blank into the path of the next succeeding unembossed blank.

Figure 15 is a side elevation of the chuck shown in Figure 14.

Figure 1:
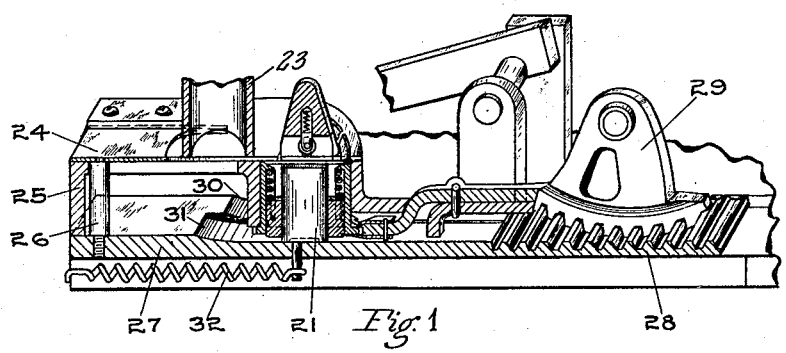
Figure 1 is a longitudinal section, partly in elevation, of my improved chuck showing the same applied in use and in position wherein the jaws are closed to grip a blank supported in the chuck.

My invention relates particularly to an improved chuck for use in an embossing and vending apparatus such as is disclosed in my United States Patent No. 1,494,839, patented May 20, 1924, wherein the blank is firmly gripped during the embossing operation and is, when subsequently released, raised above the plane of the jaws so that the finished blank may be discharged and a new blank substituted in its place by the operation of a single lever and associated mechanism by the operator.

Referring more particularly to Figures 5 to 15 inclusive, in which I have illustrated an embodiment of my invention, I have shown a preferred form of my invention in which the parts may be readily assembled or disassembled. I provide a base 1 forming part of the chuck body and having a plurality of aligned grooves 2 formed in its upper face for receiving the jaw supporting pins 3 of the type illustrated in detail in Figure 9. Portions of the upper face of the base are cut away radially as at 4 for receiving the lower offset ends 5 of the respective clutch jaws 6. Each of the jaws is pivotally carried by a pin 3 passing through an opening in a lower part of the jaw. This is illustrated clearly in Figure 6. The arcuate jaws of the chuck each comprise a body portion 6 the side walls of which converge downwardly toward the lower offset portion 5 while the upper ends of the jaws terminate in blank gripping jaw faces 7 having an outwardly extending flange 8. The flange 8 is provided with an outwardly inclined wall 9 which is adapted to engage a similarly inclined wall 10 of the chuck shell or casing 11 in a manner which will be described more fully hereinafter. The inner or gripping face of the flange is serrated as at 12 to permit the jaws to more firmly grip a blank inserted therebetween.

A complementary base section 13, forming a part of the chuck body, is likewise cut away radially at corresponding points as at 14 for purposes which will be described more fully hereinafter.

The base section 13 is also provided on its lower peripheral face with aligned grooves 15 which cooperate with the respective aligned grooves 2 formed in the base 1. When the complementary base sections are assembled and secured together by means of the bolts 16 as shown in Figure 13 the respective pins 3 which pivotally support the respective jaws 6 are clamped in place between the grooves 2 and 15.

Although I have shown my chuck as having four jaws for engaging and gripping the blank it is obvious that a greater or less number of jaws may be used without departing from the spirit of my invention or the scope of the appended claims.

I have provided means carried by the chuck for normally disposing the jaws out of a vertical plane so that an object held by the jaws when in closed position may be released by relatively moving the chuck body and shell 11. This means includes substantially aligned pins 17 and 18 carried by the base 13 and the lower offset portions of the jaws 5 respectively. It will be noted that the lower portions of the jaws extend outwardly from the planes of the jaws to provide a sufficient support for the pins 18. Compression coil springs 19 are carried by the pins 17 and 18 to exert a normal downward-pressure on the offset lower portion of the jaws and in a plane out of the axis of the pins 3 to normally force the jaws toward the position shown in Figure 15. The radial openings 4 and 14 of the complementary base sections are aligned as shown in Figure 15 when the parts are assembled and are adapted to partially inclose the lower enlarged portion of the jaw and the springs 19. In this manner none of the parts extend beyond the outer periphery of the base sections 1 and 13.

Figure 3:
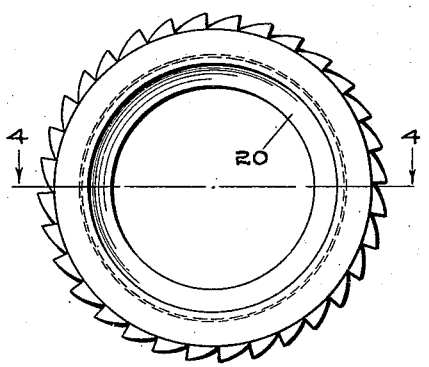
Figure 3 is a bottom view of the chuck shell or case.
Figure 4:
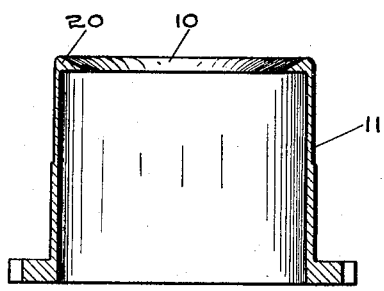
Figure 4 is a section taken on line 4—4 of Figure 3.

The chuck is movable axially in a shell or casing 11 illustrated in detail in Figures 3 and 4, and shown in broken lines in Figure 13, the shell having an annular inwardly extending flange 20 one of the walls of which is inclined as at 10 for engagement with the inclined walls 9 of the respective jaws 6. It will be noted that by virtue of the superimposed complementary base sections 1 and 13 an enlarged circumferential contact area is provided for the chuck for sliding engagement with the internal walls of the shell 11. Because of this increased contact or bearing area between the walls of the shell and the chuck relative axial movement of these parts is assured and relative side motion is prevented. It will also be noted that because of the increased contact or bearing area of the internal walls of bore of the complementary sections 1 and 13 relative axial movement between the anvil 21 and the internal walls of the chuck is also assured without the danger of relative side movement between these parts. The anvil 21 is adapted to move relatively axially of the chuck to support and raise the blank out of the plane of the gripping faces of the jaws when the jaws are in open position. The increased area of contact between the parts accurately positions the blank so that it may be discharged when released from the chuck and a succeeding blank substituted in the former blank's position.

Figure 2:
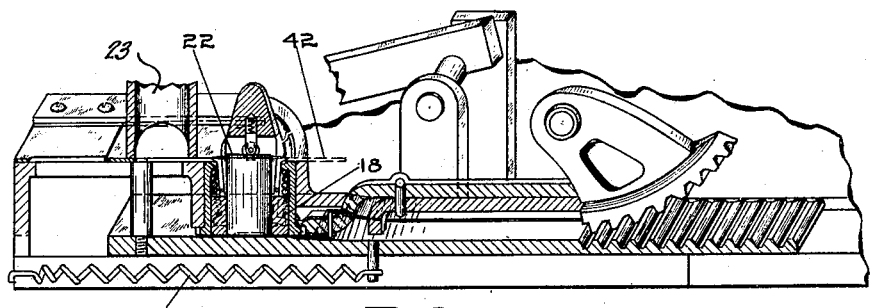
Figure 2 is a view similar to Figure 1 except that the chuck actuating slide has been moved to the right upon completion of the embossing operation. In this view the clutch is open and the anvil projected upwardly to discharge the finished blank from the chuck.

Referring now more particularly to Figures 1 and 2 of the drawings in which I have illustrated an embodiment of my invention in use in an embossing and vending apparatus similar to that disclosed in my United States Patent No. 1,494,839 patented May 20, 1924, I have shown the relative positions of the chuck jaws and other parts under conditions of use.

In Figure 1 the blank 22 is shown gripped between the jaws of the chuck where it is securely held during the embossing operation. I have shown a magazine 23 which supplies the unembossed blanks one at a time to the slide 24 which operates therebeneath by suitable mechanism. The slide passes under the mouth of the magazine and is rounded inwardly at one end to receive a blank from the magazine and propel it to the supporting anvil. The slide is supported in a frame member 25 and is connected through a post or spacing member 26 to the slide 27. The slide 27 extends and moves beneath the chuck and shell assembly and is provided with a rack 28 near one end for driving connection with a propelling gear sector 29. That portion of the slide 27 which moves beneath the chuck and shell assembly is provided with independent cam faces 30 and 31, the former extending along the marginal longitudinal walls of the slide for engagement with the bottom face of the base section 1 of the chuck, while the latter cam face 31 engages the bottom face of the anvil 21. These cams are staggered longitudinally so that in moving the slide 27 from left to right as in Figure 2, the chuck body engaging the cam faces 30 is moved axially upwardly to release the jaws 6 from the blank 22, prior to an axial upward movement of the anvil 21 as a result of the bottom anvil face riding up the cam 31. As the anvil is lifted it raises the released blank to a plane above the jaw faces of the chuck where it is discharged into a delivery chute by a new blank from the magazine. A spring 32 assists in returning the slides 24 and 27 to the position in Figure 1.

It will be noted that when the chuck body is lifted in the shell by the cams 30, the compression of the springs 19 is released to open the jaws 6 as in Figure 15. As the chuck is raised in the shell the cooperating inclined surfaces 9 and 10 of the jaws and shell respectively slide one over the other.

A compression spring 40 is carried within the shell 11 and exerts and axial pressure to maintain the chuck body in pressure engagement with the cams 30 or the upper faces 41 of the slide 27 depending upon the position of the slide.

As the slide 27 is returned to the left as in Figure 1 the anvil or ejector 21 moves downwardly in advance of the chuck body, to lower the new blank into the plane of the jaw faces 12. Then the chuck is lowered in the shell and the inclined faces 9 of the jaws slide over the annular inclined faces 10 of the shell flange to close the jaws about the blank to grip the same.

In Figure 2, I have illustrated at 42 an embossed blank being discharged from the chuck and a new blank on the anvil.

Various changes may be made in the details of construction and arrangement of parts without departing from the spirit of the invention or the scope of the appended claims.

I claim:

1. In an apparatus of the class described, a chuck having an axial bore for movably receiving an article support, said chuck including a base portion having openings therein, jaws pivotally carried by the base and having radially offset portions operating in said openings, compression springs engaging said offset portions of the jaws and a wall of said openings, said chuck base portion comprising separable complementary sections, each section having cooperating grooves on their adjacent faces, and jaw supporting pins carried in the respective cooperating grooves and gripped thereby when the said base section are assembled together, to pivotally support said jaws on the base.

2. In an apparatus of the class described, a chuck having an axial bore for movably receiving an article support, the body of said chuck having a plurality of openings therethrough communicating with the bore, jaws having pivotal connection with the chuck body within the openings and having offset portions extending radially outwardly through said openings, and compression springs engaging an end wall of the openings and the offset portions of the jaws to normally dispose the jaws in open article receiving position.

In testimony whereof, I hereunto affix my signature.

GEORGE W. HEENE.